United States Patent
Jaeger et al.

(10) Patent No.: US 8,553,212 B2
(45) Date of Patent: Oct. 8, 2013

(54) GEODESIC MEASUREMENT SYSTEM AND METHOD FOR IDENTIFYING A TARGET UNIT HAVING A GEODESIC MEASUREMENT DEVICE

(75) Inventors: Markus Jaeger, Egg (AT); Josef Lais, Marbach (AT); Daniel Nindl, Feldkirch (AT); Marco Schroeder, Dozwil (CH); Paul Benz, Diepoldsau (CH)

(73) Assignee: Leica Geosystems AG, Heerbrugg (CH)

( * ) Notice: Subject to any disclaimer, the term of this patent is extended or adjusted under 35 U.S.C. 154(b) by 254 days.

(21) Appl. No.: 13/145,551

(22) PCT Filed: Feb. 19, 2010

(86) PCT No.: PCT/EP2010/052130
§ 371 (c)(1),
(2), (4) Date: Sep. 12, 2011

(87) PCT Pub. No.: WO2010/100043
PCT Pub. Date: Sep. 10, 2010

(65) Prior Publication Data
US 2012/0008136 A1    Jan. 12, 2012

(30) Foreign Application Priority Data
Mar. 6, 2009 (EP) .................................. 09154556

(51) Int. Cl.
*G01B 11/26* (2006.01)
(52) U.S. Cl.
USPC ......................................................... 356/138
(58) Field of Classification Search
USPC ..................................................... 356/3, 138
See application file for complete search history.

(56) References Cited

U.S. PATENT DOCUMENTS

| 6,133,998 A * | 10/2000 | Monz et al. ................. 356/141.4 |
| 6,295,174 B1 | 9/2001 | Ishinabe |
| 6,587,244 B1 * | 7/2003 | Ishinabe et al. ................ 359/529 |
| 7,804,051 B2 * | 9/2010 | Hingerling et al. ......... 250/206.1 |
| 8,467,071 B2 * | 6/2013 | Steffey et al. .................. 356/614 |

FOREIGN PATENT DOCUMENTS

| CH | 676041 A5 | 11/1990 |
| CH | 676042 A5 | 11/1990 |
| EP | 0465584 A1 | 1/1992 |
| EP | 0875728 A1 | 11/1998 |
| EP | 0919837 A2 | 6/1999 |
| EP | 1734336 A1 | 12/2006 |
| EP | 1573271 B1 | 2/2008 |
| JP | 7178081 A | 7/1995 |
| WO | 2006/073129 A1 | 7/2006 |

* cited by examiner

*Primary Examiner* — Roy M Punnoose
(74) *Attorney, Agent, or Firm* — Maschoff Brennan (57) ABSTRACT

A geodesic measurement system having a geodesic measurement device. A unique identification code is allocated to each of the target objects, such that the target objects can be differentiated from one another based on the identification code. The measurement device has a distance and angle measurement functionality for determining the position of the target objects. The measurement device is designed for emission of the beam such that the identification code of a target object that is searched for from the target object volume can be modulated to the beam as a code to be searched for. The target unit has an evaluation component connected to the detector for inspecting correspondence between the code modulated to the beam and the own identification code of the target unit and a transmission component for transmission of a reactive confirmation signal to the geodesic measurement device that takes place upon correspondence being determined.

27 Claims, 5 Drawing Sheets

GEODESIC MEASUREMENT SYSTEM AND METHOD FOR IDENTIFYING A TARGET UNIT HAVING A GEODESIC MEASUREMENT DEVICE

FIELD OF THE INVENTION

The invention relates to a geodesic measurement system having a geodesic measurement device and a target unit as one of a plurality of target objects and to a method for identifying a target unit by means of a geodesic measurement device.

BACKGROUND

For measuring one or, more particularly, a plurality of target points, numerous geodesic measurement devices have been known since ancient times. In this case, distance and direction or angle from a measuring device to the target point to be measured are recorded and, in particular, the absolute position of the measuring device with reference points possibly present are detected as spatial standard data.

Generally known examples of such geodesic measurement devices include the theodolite, tachymeter and total station, which is also designated as electronic tachymeter or computer tachymeter. One geodesic measuring device from the prior art is described in the publication document EP 1 686 350, for example. Such devices have electrical-sensor-based angle and distance measuring functions that permit direction and distance to be determined with respect to a selected target. In this case, the angle and distance variables are determined in the internal reference system of the device and, if appropriate, also have to be linked with an external reference system for absolute position determination.

In many geodesic applications, points are measured by specially configured target objects being positioned there. The latter usually consist of a plumb staff with a targetable marking or a reflector for defining the measurement path or the measurement point. A central geodesic measurement device can therefore also measure a relatively large number of target objects, although this necessitates the identification thereof. In the case of such measurement tasks, for controlling the measurement process and for defining or registering measurement parameters, a number of data, instructions, speech and further information are transmitted between target object—more particularly a handheld data acquisition device at the target object—and central measuring device. Examples of such data include the identification of the target object, inclination of the plumb staff, height of the reflector above ground, reflector constants or measurement values such as temperature or air pressure.

Modern total stations as geodesic measurement devices additionally have microprocessors for digital further processing and storage of detected measurement data. The devices generally have a compact and integrated design, wherein coaxial distance measuring elements and also computing, control and storage units are usually present in a device. Depending on the expansion stage of the total station, motorization of the targeting or sighting device and means for automatic target seeking and tracking can additionally be integrated.

Examples of tracking devices for geodesic devices for tracking a reflector used as a target are described in EP 0 465 584, JP 05322569, JP 07103761 and DE 195 28 465.

Devices for automatic—more particularly coarse—target seeking use, for example, a vertically and/or horizontally fanned-out laser beam emitted by the geodesic device, e.g. theodolite. If, during the movement of the theodolite about the vertical or tilting axis, the reflector arranged at the target station is impinged on and, consequently, part of the laser beam is retroreflected, a signal is generated by a receiving photodiode arranged in the telescope of the theodolite, with the aid of which signal the drive of the telescope is then stopped. What is advantageous in this case is that the system possibly reacts to all reflectors situated in the field of view, thus e.g. also to further target units that are present, but not of interest, or disturbing reflectors such as reflective films, reflectors of vehicles, window panes or similar articles.

The patent specification CH 676 042 discloses a device having a fan-like transmitter and receiver, which device is accommodated in a rotatable measuring head. The transmitting unit emits light pulses in a light fan, and the reflected pulses are correspondingly evaluated with regard to angle information.

A development of the above target seeking device for coarsely determining the target coordinates is described in CH 676 041. This involves a combination with an optoelectronic device for fine measurement. The actual target seeking device spans two mutually perpendicular fans used to coarsely measure the position of the target point two-dimensionally, and the subsequent fine measurement by means of the second device can then be carried out without the target seeking process.

In most cases, the seeking process is manually supported by means of radiotelephony or radio data transmission. In the case of the device described in the document DE 197 334 91, an additional optical receiving unit fitted to the target object is used to check whether the seeking beam of the tachymeter impinges on the target object. If the seeking fan is received, then the target object communicates a hit message to the tachymeter by means of radio data transmission, whereupon the seeking is stopped and fine targeting is effected. In particular, in this case, after receiving the first hit message, the tachymeter begins a rotation in the opposite direction. If the light beam from the transmitter unit impinges on the receiver for a second time, a feedback message is in turn reported to the tachymeter. On the basis of the time that has elapsed between the two hits in the electronic unit of the tachymeter, a position of the target object is determined.

A prism device having an additional receiving device for the optical transmission from a geodesic measuring device to the prism device is presented in U.S. Pat. No. 6,295,174. In this case, radiation is coupled out by means of an optical path from the region of the reflector and transmitted to a receiving area of the receiver, which is arranged axially parallel. The reception state is indicated by two LEDs that emit light in different colors.

EP 1 734 336 discloses a measurement system having a target unit, which has a reflector and also an optical receiver and transmitter. Said document proposes using the optical transmitter of the target unit, inter alia, for supporting the automatic target seeking process. Thus, after receiving the seeking or measurement radiation, the target object can communicate the dedicated identification, such as, for example, the reflector number or the reflector type, back to the measurement station with the aid of the transmitter of the target unit. The measurement station can thus identify the target object sought and configure itself optimally with regard to the target object.

EP 1 573 271 also discloses a target unit having an optical transmitter, wherein—after receiving measurement radiation from a measurement device—the target unit sends back an optical signal, on which the dedicated identity of the target unit is modulated.

One significant disadvantage of the devices known hitherto is an inadequate robustness against incorrect identification of the target unit in the case of a plurality of target units situated in the field of view. In some devices in the prior art there is likewise the risk of inadvertent interpretation of a reflective foreign object as the target object. Moreover, in some known devices in the prior art, the complex communication of the target unit identities from the respective target units to the measurement device proves to be disadvantageous.

If e.g. a plurality of target units are set up which—e.g. in accordance with the technical teaching from EP 1 573 271— each communicate their dedicated identity to the measurement device in reaction to detection of a seeking beam, then the measurement station receives a respective identity communicated from each of the targets. If, however, only one target unit is sought in this case, then a disadvantageously high data processing complexity is required on the part of the measurement device in order to evaluate the multiplicity of responses of the respective target units and to filter and identify the target unit actually sought from the responses of all the target units.

SUMMARY

One object of the invention, therefore, is to provide a geodesic measurement system having a measurement device and a target unit, and a method for identifying a target unit by means of a measurement device, wherein an alternative and, more particularly, improved identification of the target unit from a target object set is made possible.

In particular, here—in the case of a plurality of target units situated in the field of view of the geodesic measurement device—a search for a specific target unit is intended to be simplified and nevertheless enabled in a manner as robust as possible against incorrect identification. More specifically, here a lower data processing complexity for the measurement device for identifying the target unit from the target object set is intended to be necessary.

These objects are achieved by means of the realization of the characterizing features of the independent claims. Features that develop the invention in an alternative or advantageous manner can be gathered from the dependent patent claims.

The invention breaks away from generic measurement systems having active target units in the prior art, in which the target units situated in the field of view themselves in each case always communicate their dedicated identity back as a response upon detection of a seeking beam from the measurement device.

By contrast, according to the invention, an identification code of the sought target object is already modulated as code to be sought on an optical beam emitted—more particularly for automatic target seeking—from the measurement device. The target unit has, alongside a target mark, such as a reflector, a receiver for the beam and also an evaluation component for checking whether the code modulated on the received beam corresponds to the dedicated identification code.

In the case of correspondence ascertained here, the target unit communicates to the measurement device a reactive confirmation signal that is suitable such that, on the basis of the confirmation signal, more specifically depending on a point in time of the reception thereof, the target unit can be identified by the measurement device. In particular, here the target unit emits a response signal exclusively only in the case of correspondence having been ascertained.

The confirmation signal, which is transmitted e.g. optically or by radio, here can constitute a standard signal, such that this does not necessarily have to carry once again the dedicated identity of the responding target unit. On account of the already selective seeking enquiry, here the target unit can nevertheless be uniquely identified on the basis of the confirmation signal.

The invention thus enables error-insusceptible identification of a sought target unit by the geodesic device, without the identities of a plurality of responding target units in each case having to be processed on the part of the measurement device during target seeking. By contrast, the seeking is already fashioned selectively, such that the measurement device only receives a corresponding response from the target unit or units actually sought. Consequently, the processing complexity on the part of the measurement device with regard to the identities respectively received from different target units can be considerably reduced, since, according to the invention, selectively already only that target unit which is sought and the position of which is to be measured responds to the, more particularly vertically fanned-out, seeking beam from the measurement device.

By way of example, the identification method according to the invention takes place as follows: in the context of an automatic seeking process for finding a target unit to be measured by means of a measurement device, the latter emits a seeking laser beam, on which the ID of the sought target is already modulated as code to be sought.

The seeking laser beam can be emitted, for example, as a fanned-out laser beam (seeking fan) and be pivoted and/or inclined for the purpose of searching a field-of-view range— more particularly within a specific angular range. More specifically, a vertical, horizontal or inclined fanning-out of the seeking beam can be provided, wherein the seeking beam can be rotated e.g. about a vertical axis of the measurement device or about a horizontal axis.

The target unit has e.g. an all-around prism as reflector and an optical receiver, more particularly an all-around receiver having an omnidirectional reception range. If the seeking fan then impinges on the target unit during a seeking process, it is detected by the receiver and an evaluation component of the target unit compares the code modulated on the fan with the dedicated ID. In the case of correspondence, the target unit communicates a confirmation signal to the measurement device reactively, more particularly with a known temporal response delay.

The process of communicating back the reactive confirmation signal by means of the target unit in the case of the ascertained correspondence of the IDs can be effected here
- with the aid of an optical transmitter (LED or laser) at the target unit and/or
- by radio, for example by means of a peripheral device— connected to the measurement device by a radio link—at the target unit.

The measurement device receives the correspondence signal, stops the seeking process and moves—more particularly taking account of the known time delay for the generation and communication of the correspondence signal—back to the azimuth angle of the target unit having the "correct" ID sought.

The checking of the IDs and the process of generating and also communicating back the correspondence signal on the part of the target unit can be effected here as rapidly as possible—that is to say directly after the reception and checking of the seeking beam—and the time required for this purpose can be respectively currently detected as a response delay. In the case where the process of communicating back a confirmation signal as a response to the selective seeking enquiry is effected as rapidly as possible, a time period of zero can fictitiously also be assumed as a response delay.

Alternatively, however, it is also possible to fixedly predetermine a defined response delay for communicating back the correspondence signal, such that the target unit in the case of correspondence having been ascertained always emits the confirmation signal—purely by way of example—exactly 0.05 second after the reception of the seeking fan.

If, during the seeking process, the seeking fan impinges on further target units positioned in the field of view of the measurement device, then these target units also compare the modulated ID with the respective dedicated ID. In the case of non-correspondence of the IDs, either no response signal at all or a defined non-correspondence signal is communicated and the seeking process of the measurement device is not interrupted or continued.

On the basis of the reactive confirmation signal according to the invention from the target unit, a processing component of the measurement device can therefore reliably identify the target unit sought.

In accordance with methods from the prior art, by contrast, all target units that detect the seeking beam transmit the dedicated ID as a response to a seeking fan back to the measurement device, as a result of which a disadvantageously high data processing complexity is required on the part of the measurement device in order to evaluate the multiplicity of responses—which contain the respective IDs of the target units. As a result of the automatic target seeking that is already fashioned selectively according to the present invention, said data processing complexity on the part of the measurement device can now be significantly reduced since in each case only one corresponding confirmation signal from the targets actually sought is received.

After the identification of the target unit according to the invention, it is possible—as known sufficiently from the prior art—for a, more particularly automatic, fine targeting of the target unit and a highly precise determination of the position thereof to be effected by means of the measurement device.

As an alternative to the modulation of the ID of the sought target object onto a fan-type, rotating seeking beam, which can have a wavelength of 850 nm, for example, the sought ID can, however, also be modulated on a beam which is emitted for electronic distance measurement, and which can have a wavelength of 780 nm, for example, or a beam which is emitted for automatic fine targeting, and which can have a wavelength of 780 nm, for example. By way of example, the identity of the target unit can thereby be ensured on the basis of the confirmation signal during an actual measurement process as well.

Suitable types of modulation for modulating the identification code of the sought target object as code to be sought on the beam emitted by the measurement device are known to the person skilled in the art. For example, a corresponding intensity modulation of the emitted beam can be effected.

In accordance with a further embodiment of the measurement system according to the invention, in particular a plurality of target objects of the target object set are embodied as target units, each having     a reflector, more particularly an optical retroreflector,
    a detector for receiving the optical beam,
    an evaluation component connected to the detector and serving for checking whether the code modulated on the received beam corresponds to the dedicated identification code, and     a transmitting component for communicating a reactive confirmation signal to the geodesic measurement device if the evaluation component ascertains a correspondence.

BRIEF DESCRIPTION OF THE DRAWINGS

The method according to the invention and the device according to the invention are described in greater detail below purely by way of example on the basis of concrete exemplary embodiments illustrated schematically in the drawings, further advantages of the invention also being discussed. In the figures, specifically.

DETAILED DESCRIPTION

Figure 1:
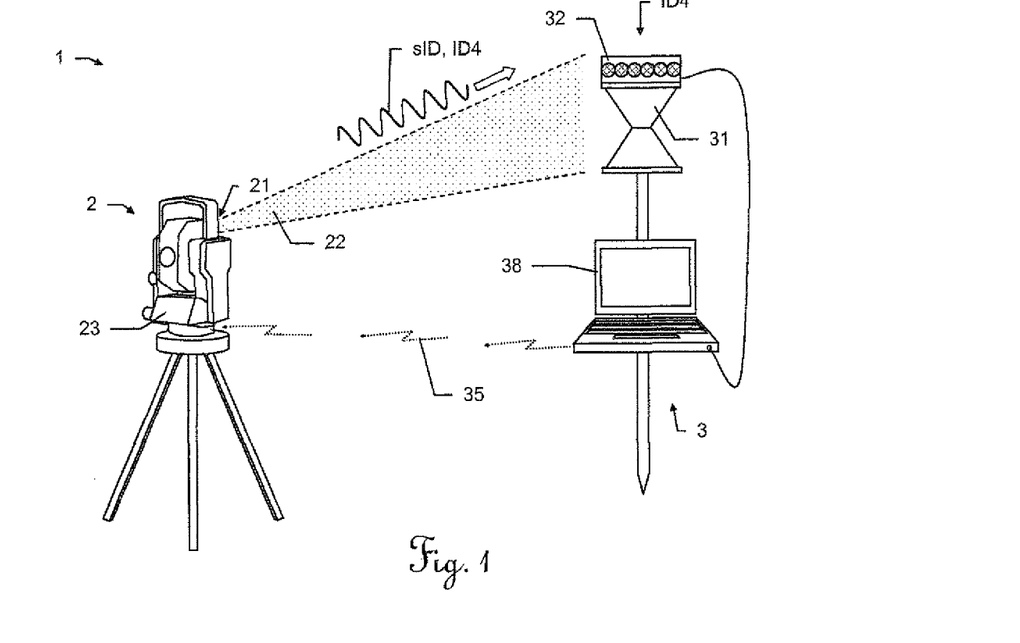
FIG. 1 shows a geodesic measurement system according to the invention, wherein a confirmation signal is communicated by radio from the target unit to the measurement device.

FIG. 1 shows a geodesic measurement system 1 according to the invention, having a geodesic measurement device 2 embodied as a total station, and having a target unit 3, which represents one of a plurality of target objects of a target object set. For the sake of simplicity, the further target objects of the target object set—apart from the target unit 3—are not illustrated in FIGS. 1 to 6.

In this case, the target objects are respectively assigned a unique identification code, e.g. an ID number, in such a way that the target objects can be differentiated from one another on the basis of the identification code.

The measurement device 2 has a distance and angle measuring functionality for determining the position of the target objects and at least one—not directly visible on account of the perspective illustration in FIG. 1—radiation source 21 for emitting an optical beam 22 in a defined spatial direction. In particular, the optical beam 22 is a vertically fanned-out laser beam of an automatic target seeking device of the measurement device 2, wherein the fan-type laser beam—for the purpose of searching a field-of-view range, can be pivoted horizontally about a vertical axis of the measurement device 2.

The target unit 3 has a reflector 13, more particularly an optical all-around retroreflector, and a detector 32 for receiving the optical beam 22. In this case, the reflector 31 and the detector 32 can be fixed to a common measurement rod, in particular wherein the detector 32 is arranged above or below the reflector 31 in a manner adjacent thereto. Alternatively, however, the detector 32—as known from the prior art—can also be integrated into the reflector 31. More specifically, the detector 32 is also embodied as an all-around detector having a horizontal angle detection range of 360°, for which purpose the detector 32 can have, for example, a multiplicity of detection elements, such as CCD or CMOS sensor elements, for instance, which are arranged in a circular fashion with a radial orientation.

According to the invention, the measurement device 2 is now designed for emitting the optical beam 22 in such a way that the identification code ID4 of a sought target object of the target object set is modulated as code sID to be sought on the beam 22. In other words, the emitted seeking fan 22 already carries a selective seeking enquiry that can be read out on the target station side. In the case illustrated in FIG. 1, the measurement device seeks the target unit 3 having the identification code ID4 as the target object to be measured, for which reason precisely said identification code ID4 is modulated as code sID to be sought on the seeking fan 22.

For detecting and reading out the seeking enquiry which is modulated on the seeking fan 22 and which consists at least of the code sID to be sought, the target unit 3 has an evaluation component connected to the detector 32. For reading out the code sID modulated on the seeking fan 22, the seeking fan radiation received by the detector 32 is in this case also demodulated. Furthermore, the evaluation component is designed for checking whether the code sID modulated on the beam 22 corresponds to the dedicated identification code ID4 of the target unit 3.

If correspondence is ascertained, which is the case in FIG. 1 since the target unit 3 represents the target object sought by the measurement device 2, the target unit 3 communicates a reactive confirmation signal 35 to the measurement device 2. For this purpose, the target unit 3 has a transmitting component designed for communicating such a confirmation signal 35. That is to say that, in the case of an ascertained correspondence of the IDs, the target unit 3 transmits said confirmation signal 35 as a response to the selective seeking enquiry to the measurement device 2. More specifically, the reactive confirmation signal 35 is in this case communicated with a known temporal response delay after the detection of the optical beam 22 from the target unit 3 to the measurement device 2.

The transmitting component of the target unit can be embodied e.g. as a radio module for emitting a radio signal as the reactive confirmation signal 35. In particular, the radio module and/or the evaluation component can in this case be integrated into or provided by a handheld mobile peripheral device 38—connected to the detector 32—with a remote control function for the measurement device 2—such as e.g. into a field computer or a data logger of the target unit.

Since, in the case illustrated in FIG. 1, the measurement device 2 seeks precisely the target unit 2 as the target object to be measured, the identification code ID4 read out from the seeking fan corresponds to the dedicated identity ID4 of the target unit 3 shown, such that the target unit 3 communicates, in reaction to the selective seeking enquiry, the corresponding confirmation signal 35 by radio to the measurement device 2.

The measurement device 2 receives the reactive confirmation signal 35 e.g. with the aid of a receiving unit, which is designed for expecting the confirmation signal 35 within a predetermined time window during and/or after the emission of the beam 22, and can identify, by means of a processing component 23, the target unit 3 sought from the target object set on the basis of the confirmation signal 35, more particularly depending on a point in time of the reception of the confirmation signal 35.

More specifically, in this case the measurement device 2 is equipped with an automatic target seeking function and is designed for detecting parts of the fan-type seeking beam 22 that are respectively reflected at target objects of the target object set as reflections, wherein the reflections are assigned a measured angle and, in particular, a measured distance.

As identification, the evaluation unit 23—depending on the point in time of the reception of the confirmation signal 35—can then allocate the identification code ID4 of the target unit 3, which represents the target object sought and actually found, to one of the detected reflections and therefore link the corresponding reflection with the identification code ID4.

Figure 2:
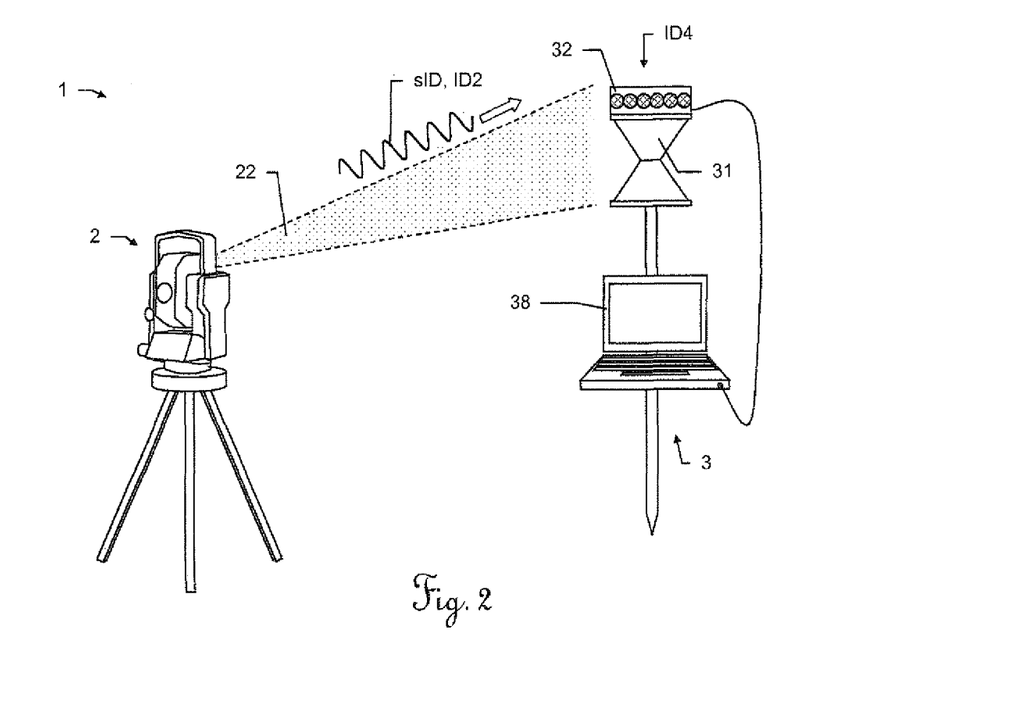
FIG. 2 shows a geodesic measurement system according to the invention, wherein—on account of non-correspondence of the IDs having been ascertained—no response signal is communicated from the target unit to the measurement device.

FIG. 2 depicts an exemplary application in which the target unit 3 shown does not represent the target object sought by the measurement device 2.

Therefore, an identification code ID2 that differs from the identification ID4 of the target unit 3 shown is modulated as the code sID to be sought on the fan-type seeking beam 22.

If, during the seeking process, the seeking fan 22 impinges on the target unit 3 positioned in the field of view of the measurement device 2, then said target unit compares the modulated code sID with the dedicated identification code ID4. On account of the non-correspondence of the IDs, no response signal is communicated and the seeking process of the measurement device 2 is not interrupted.

The reflection which is detected in the context of the automatic target seeking and is generated in the course of the seeking fan 22 sweeping over the target unit 3 shown and is registered by the measurement device 2 can be identified on the part of the measurement device 2 e.g. as a disturbing reflection or as a target object "not sought", or alternatively can even be immediately erased from a reflection memory. It is likewise possible to handle further reflections from further target objects "not sought" for which no reactive confirmation signal is received on the part of the measurement device 2 and, consequently, which evidently do not represent the target object actually sought.

Figure 3:
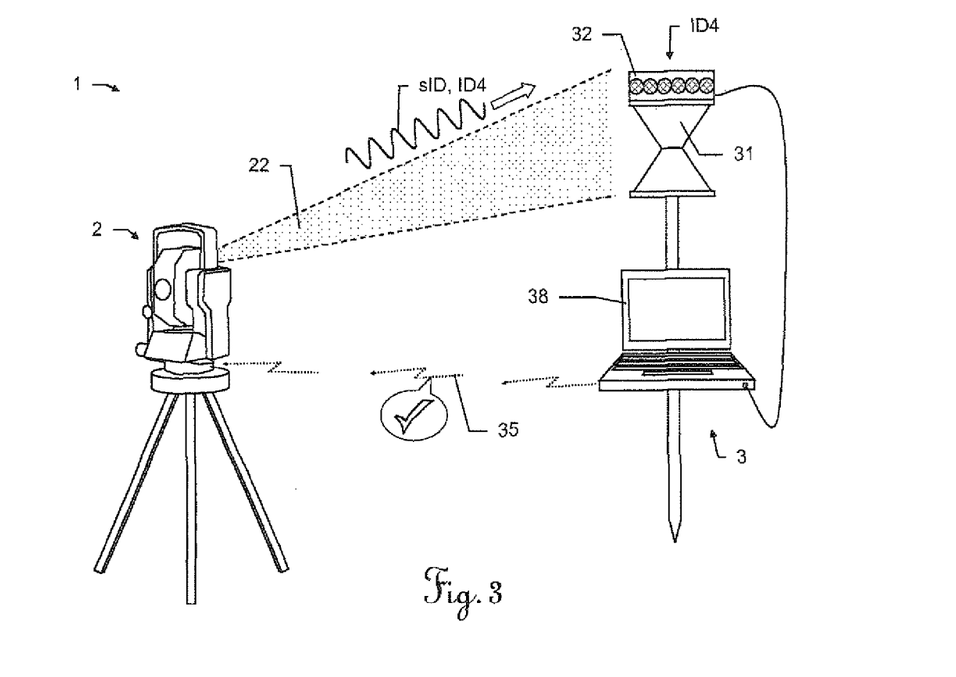
FIG. 3 shows a geodesic measurement system according to the invention, wherein a confirmation signal with additional correspondence information is communicated by radio from the target unit to the measurement device.

FIG. 3 shows a further exemplary application, wherein—as in FIG. 1—once again the target unit 3 depicted represents the target object sought by the measurement device 2.

In this case, the target unit 3 is embodied in such a way that the reactive confirmation signal 35 contains additional information. By way of example, for unambiguously confirming the seeking enquiry, the confirmation signal 35 sent back as a response can once again have the identification code ID4 of the target unit 3, such that an overdetermined identification is made possible and, consequently, the susceptibility to errors can be reduced.

Alternatively or additionally, however, the reactive confirmation signal 35 communicated by radio can also contain data such as the current time delay between detecting the seeking fan 22 and communicating back the confirmation signal 35, inclination of the plumb staff, height of the reflector 31 above ground, reflector constants and/or measurement values, such as temperature or air pressure, detected on the part of the target unit 3.

Figure 4:
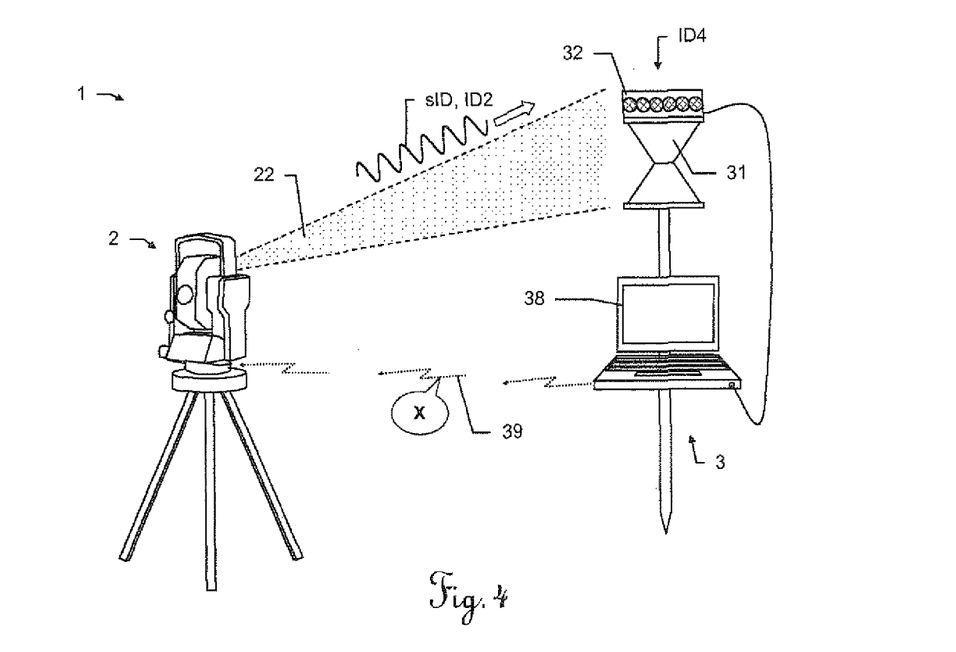
FIG. 4 shows a geodesic measurement system according to the invention, wherein a response signal with non-correspondence information is communicated by radio from the target unit to the measurement device.

FIG. 4 shows—in a similar manner to that of FIG. 2—a further exemplary application, in which the target unit 3 depicted does not represent the target object sought by the measurement device 2.

Therefore, once again an identification code ID2 that differs from the identification code ID4 of the target unit 3 depicted here is modulated as code sID to be sought on the fan-type seeking beam 22.

If, during the seeking process, the seeking fan 22 of the measurement device 2 impinges on the target unit 3 positioned in the field of view, then said target unit compares the modulated code sID with the dedicated identification code ID4 and ascertains a non-correspondence. In FIG. 4, the target unit 3 is now embodied in such a way that, in the case of non-correspondence, a negative response signal 39, i.e. a defined non-correspondence signal, is communicated to the measurement device 2.

In this case, together with the negative response signal 39, by radio, it is nevertheless possible to communicate additional information such as e.g. the dedicated identification code ID4 of the target unit 3 or further data to the measurement device 2.

Figure 5:
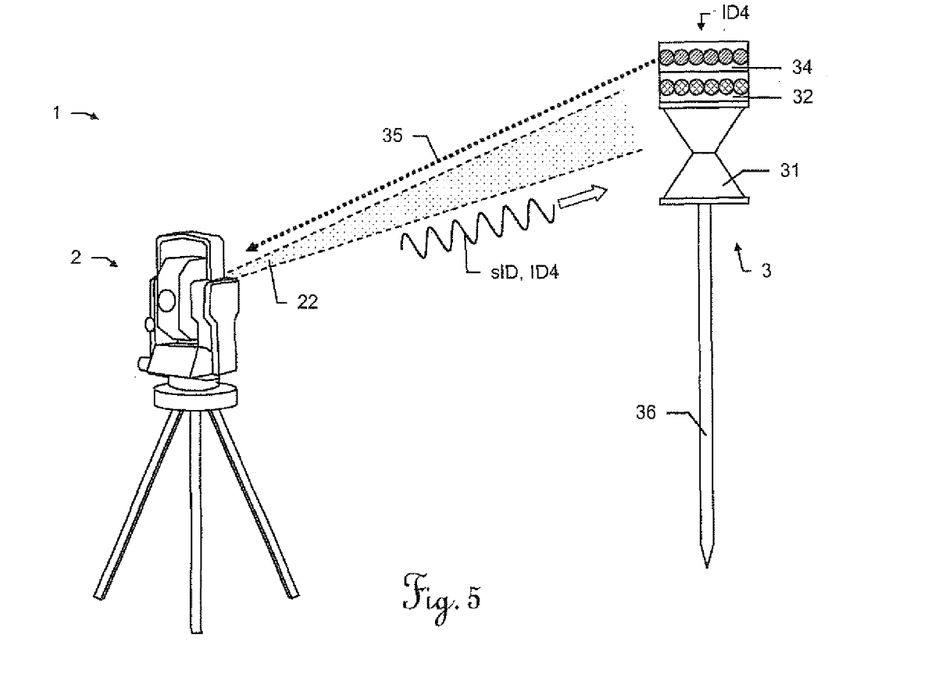
FIG. 5 shows a geodesic measurement system according to the invention, wherein an optical signal is communicated as confirmation signal from the target unit to the measurement device.
Figure 6:
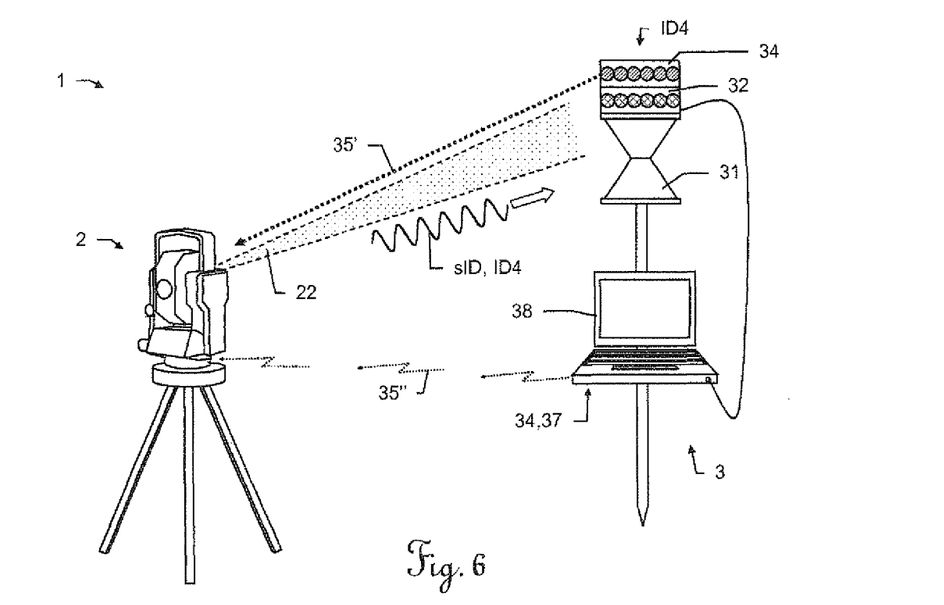
FIG. 6 shows a geodesic measurement system according to the invention, wherein both an optical signal and a radio signal are communicated as confirmation signals from the target unit to the measurement device.

FIGS. 5 and 6 show—in a manner similar to that in FIGS. 1 and 3—further exemplary applications, in which the target unit 3 depicted represents precisely the target object sought by the measurement device 2.

In contrast to FIGS. 1 and 3, however, the target unit 3 in FIG. 5 has a transmitting component 34 embodied as a light source and serving for communicating the confirmation signal 35. In particular, the light source in this case has a plurality of LEDs or laser diodes oriented in different spatial directions, such that the optical radiation is emitted—as the reactive confirmation signal 35—omnidirectionally. More specifically, the optical radiation can have a characteristic such that it can be unambiguously distinguished from disturbing reflections and/or sunlight by the measurement device 2 during detection.

The reflector 31, the detector 32 and the light source of the target unit 3 can be arranged on the measurement rod 36 for example in a manner following one another linearly in a vertical direction, wherein the order of arrangement of the components can also be chosen to be arbitrarily different than that illustrated in FIG. 5. In this case, the evaluation component can e.g. be concomitantly integrated into a housing of the detector 32 or of the transmitting component 34.

As an alternative to the arrangement following one another linearly, however, the detector and/or the light source can also be integrated into the reflector embodied as an all-around prism, for example.

The target unit 3 depicted in FIG. 6 has both a light source and a radio module 37 integrated into the peripheral device 38 as transmitting components 34 for communicating both an optical confirmation signal 35' and a confirmation signal 35" by radio. As a result, it is possible e.g. to further increase the robustness of the measurement system 1 with regard to the identification of the target unit 3.

Figure 7:
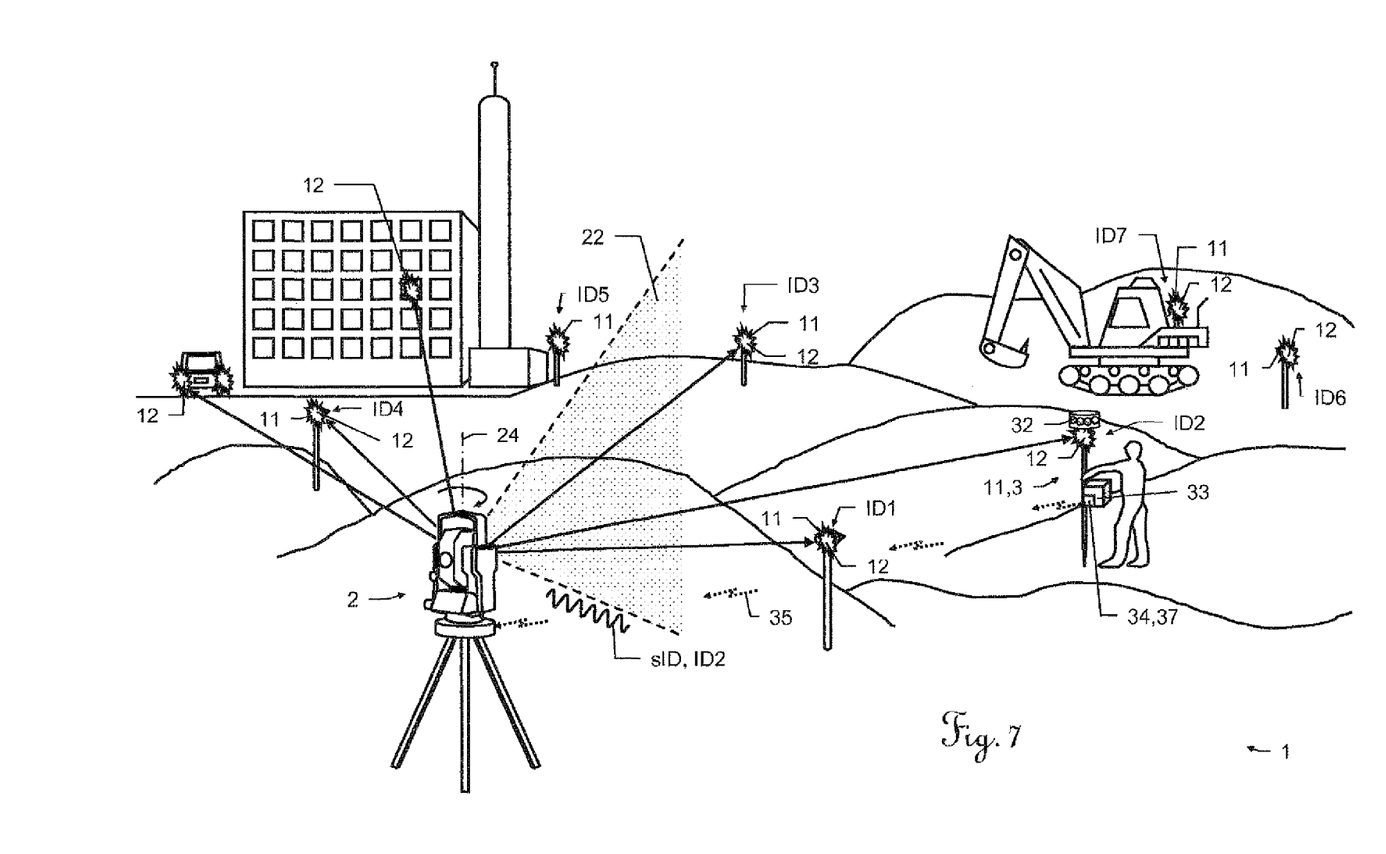
FIG. 7 shows a first example of an automatic seeking and identifying method according to the invention in the context of a typical practical application in the field.
Figure 8:
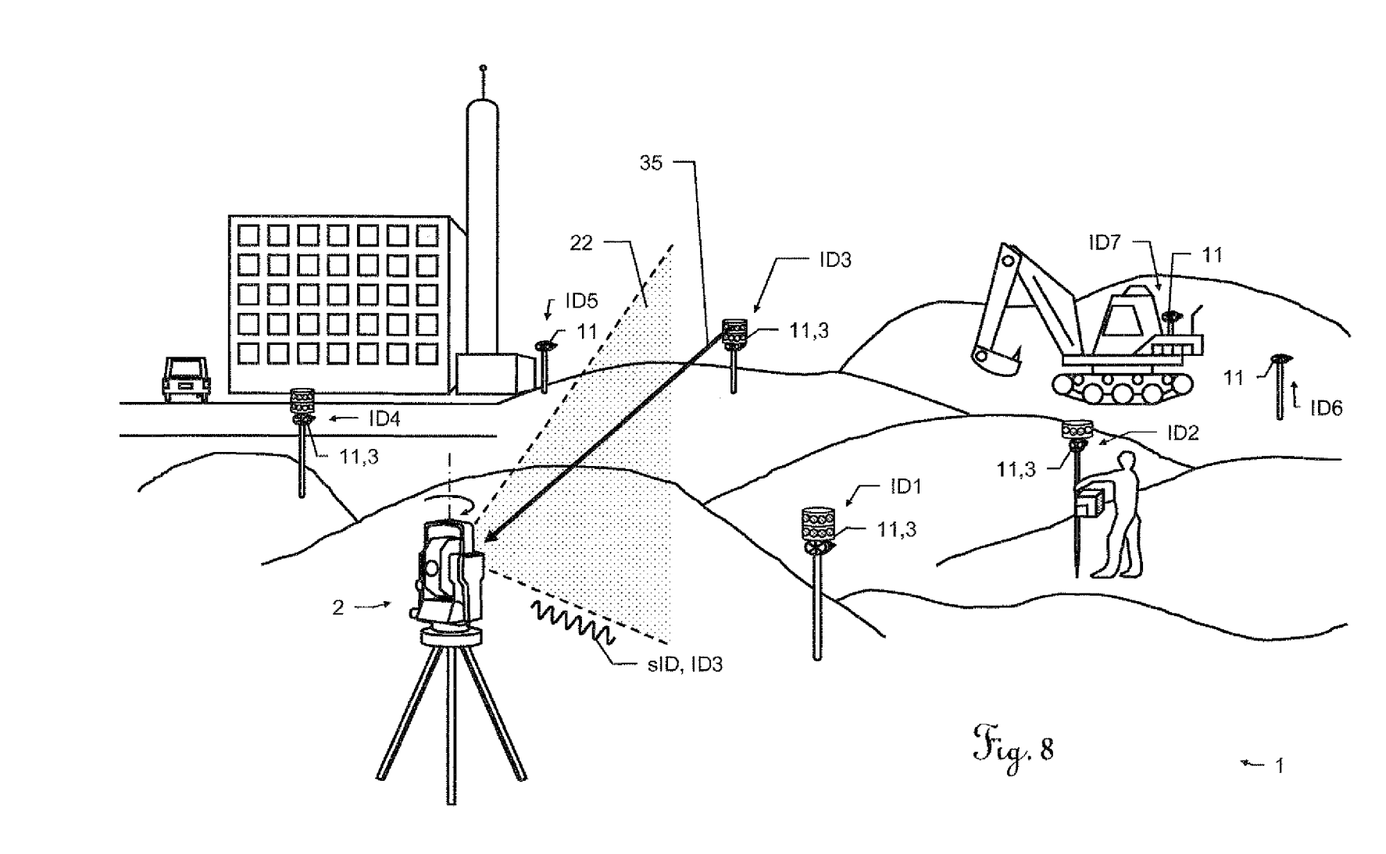
FIG. 8 shows a second example of an automatic seeking and identifying method according to the invention in the context of a typical practical application in the field.

FIGS. 7 and 8 show examples of an automatic seeking and identifying method according to the invention in the context of in each case a typical practical application in the field.

The method according to the invention is effected with at least one target unit 3 representing one of a plurality of target objects 11 of a target object set, and with a geodesic measurement device 2 having a distance and angle measuring functionality. In this case, the target objects 11 are respectively assigned a unique identification code ID1-ID7, such that the target objects 11 can be unambiguously differentiated from one another on the basis of the identification code ID1-ID7.

In the method for identifying the target unit 3 by means of the geodesic measurement device 2, the measurement device 2 emits an optical beam 22 in a defined spatial direction, more particularly a vertically fanned-out laser beam, which is pivoted about a vertical axis 24 of the measurement device 2 for the purpose of searching a field-of-view range. If the optical beam 22 impinges on the target unit 3, then it is detected by the target unit 3.

According to the invention, in this case an identification code ID2 of a sought target object 11 to be measured of the target object set is modulated as code sID to be sought on the optical beam 22.

The target unit 3 demodulates the detected beam 22 and checks whether the code sID modulated on the received beam 22 corresponds to the dedicated identification code ID2. If the evaluation component 33 in this case ascertains a correspondence, the target unit 3 communicates a reactive confirmation signal 35 to the geodesic measurement device 2. In particular, in this case the reactive confirmation signal 35 can be transmitted with a known temporal response delay after the reception of the optical beam 22 to the measurement device 2.

Afterward, the measurement device 2 can identify the target unit 3 sought on the basis of the reactive confirmation signal 35, more particularly on the basis of a point in time of reception of the reactive confirmation signal 35.

In this case, the optical beam 22 emitted on the part of the measurement device 2 can, more specifically, for the purpose of searching a field-of-view range of the measurement device 2, be inclined within a defined angular range and/or be pivoted about a vertical axis 24 of the measurement device 2.

In this case, the target unit 3, more particularly a reflector of the target unit 3, can reflect part of the incident optical beam 22 back in the direction of the measurement device 2.

The geodesic measurement device 2 can therefore receive parts of the beam 22 that are reflected at target objects 11, and can detect them as reflections 12, wherein the reflections 12 are assigned a measured angle and, in particular, a measured distance. FIG. 7 schematically illustrates reflections 12 produced upon the impingement of the seeking fan 22 on the target objects 11 and also upon impingement on further reflective surfaces situated in the field of view. The reflections 12 can be registered by the measurement device 2 in an angle-dependent manner.

As the process of identifying the target unit 3, in a manner depending on the confirmation signal 35, more particularly depending on the point in time of the reception of the confirmation signal 35, the corresponding reflection 12 from the set of detected reflections 12 is then selected and linked with the identification code ID2 of the target unit 3.

In this case, the linking of the selected reflection 12 with the target unit 3 or with the identification code ID2 of the target unit 3 can take place in a manner taking account of the known temporal response delay and also depending on     the point in time of the reception of the confirmation signal 35,     an angle linked with the point in time of reception, and/or     a distance information item.

The identification code ID2 of the sought target object 11 is modulated here as code sID on the seeking fan 22 depicted in FIG. 7, said object, in the case shown, being represented by the target unit 3 held by a user. Therefore, in reaction to the seeking fan 22, the target unit 23 automatically communicates the confirmation signal 35 to the measurement device 2 with the aid of the transmitting component 34 embodied as a radio module 37, such that the measurement device 2 can assign to the sought target unit 3 that reflection 12 which corresponds temporally—taking account of the response delay—to the confirmation signal 35.

In FIG. 8, the target object 11 having the identification code ID3 is sought, for which reason said identification code ID3 is modulated as code sID to be sought on the seeking fan 22. All the target units 3 positioned in the field of view read out the modulated code sID upon impingement of the seeking fan 22 and compare said code with the respective dedicated identification code ID1, ID2, ID3, ID4. According to the invention, the sought target unit 3 having the correct identification code ID3 once again reactively communicates a confirmation signal 35. In this case, the confirmation signal 35 is communicated optically by means of a light source present on the target unit side. The further target units 3 positioned in the field do not communicate a response signal in reaction to the impinging seeking fan 22, since they do not ascertain a correspondence between the code sID modulated on the seeking fan 22 and the respective dedicated identification code ID1, ID2, ID4.

If a plurality of target units are sought, in accordance with a further embodiment, a plurality of identification codes of a plurality of target units from the target object set can also be modulated as codes to be sought on the seeking beam emitted on the part of the measurement device, such that precisely the target units respectively sought, upon impingement of the seeking fan, communicate a reactive confirmation signal back to the measurement device. If the confirmation signal emitted on the target unit side in this case additionally respectively carries the dedicated identity of the respective target unit, then the measurement device can identify the target units unambiguously in each case. It is advantageous here according to the invention that the target units "not sought" from the target object set remain "silent" and do not likewise transmit their identity as a response upon impingement of the seeking beam, as a result of which the complexity on the part of the measurement device with regard to processing the responses of the target units can be considerably reduced.

It goes without saying that these illustrated figures only schematically illustrate possible exemplary embodiments. The different approaches can likewise be combined with one anther and also with methods from the prior art.

In the context of the present invention, the term "geodesic measurement device" is intended always to be understood to mean, in a generalizing manner, a measuring instrument, for example a theodolite or a total station, having devices for measuring or checking data with a spatial reference. In particular, this concerns the measurement of distance and/or direction or angles with respect to a reference of measurement point. Furthermore, however, even further devices, e.g. components for satellite-based position determination (e.g. GPS, GLONASS or GALILEO), can be present, which can be used for supplementary measurements or data recordings.

What is claimed is:

1. A geodesic measurement system comprising:
a geodesic measurement device; and
a plurality of target objects, which form a target object set, wherein each of the target objects is respectively assigned a unique identification code such that the target objects can be differentiated from one another on the basis of the identification code, wherein:
the measurement device has a distance and angle measuring functionality for determining the position of the target objects and at least one radiation source for emitting an optical beam in a defined spatial direction;
one of the target objects is embodied as a target unit and has a reflector and a detector for receiving the beam;
the measurement device is designed for emitting the beam in such a way that the identification code of a sought target object from the target object set can be modulated as a code to be sought on the beam;
the target object has an evaluation component connected to the detector and serving for checking a correspondence between the code modulated on the beam and the dedicated identification code of the target unit and a transmitting component for the communication—effected upon correspondence—of a reactive confirmation signal to the geodesic measurement device; and
the measurement device has a processing component, which is designed for identifying the target unit from the target object set on the basis of the reactive confirmation signal.

2. The geodesic measurement system as claimed in claim 1, wherein the geodesic measurement device includes a theodolite or total station.

3. The geodesic measurement system as claimed in claim 1, wherein the at least one radiation source of the geodesic measurement device emits the optical beam in a pivottable, vertically fanned-out laser beam.

4. The geodesic measurement system as claimed in claim 1, wherein processing component of the geodesic measurement device is designed for identifying the target unit from the target object set depending on a point in time of reception of the reactive confirmation signal.

5. The geodesic measurement system as claimed in claim 1, wherein the target unit is designed for communicating the reactive confirmation signal to the measurement device with a known temporal response delay after the detection of the optical beam.

6. The geodesic measurement system as claimed in claim 1 wherein the measurement device is designed for detecting parts of the beam that are respectively reflected at target objects of the target object set as reflections, wherein the reflections are assigned a measured angle andt, as identification, links with the target unit that reflection which corresponds temporally, taking account of the known response delay, to the confirmation signal.

7. The geodesic measurement system as claimed in claim 1 wherein the measurement device is designed for detecting parts of the beam that are respectively reflected at target objects of the target object set as reflections, wherein the reflections are assigned a measured angle and, a measured distance, and the processing component, as identification, links with the target unit that reflection which corresponds temporally, taking account of the known response delay, to the confirmation signal.

8. The geodesic measurement system as claimed in claim 1, wherein the reflector are fixed to a common measurement rod.

9. The geodesic measurement system as claimed in claim 1, wherein the reflector, embodied as an all-around retroreflector, and the detector, designed for omnidirectional reception, are fixed to a common measurement rod, wherein the detector is arranged above or below the reflector in a manner adjacent thereto.

10. The geodesic measurement system as claimed in claim 1, wherein the transmitting component is embodied as a light source for the omnidirectional emission of optical radiation as the reactive confirmation signal.

11. The geodesic measurement system as claimed in claim 10, wherein the reflector, the detector and the light source are arranged such that they follow one another linearly in a vertical direction, or the detector and/or the light source are/is integrated into the reflector.

12. The geodesic measurement system as claimed in claim 1, wherein the transmitting component is embodied as a plurality of LEDs oriented in different spatial directions for the omnidirectional emission of optical radiation as the reactive confirmation signal, wherein the optical radiation has a characteristic such that it can be distinguished from disturbing reflections and sunlight.

13. The geodesic measurement system as claimed in claim 1, wherein the transmitting component is embodied as a radio module for emitting a radio signal as the reactive confirmation signal.

14. The geodesic measurement system as claimed in claim 13, wherein the radio module and/or the evaluation component are/is integrated into a handheld peripheral device connected to the detector with a remote control function for the measurement device.

15. The geodesic measurement system as claimed in claim 1, wherein:
   a plurality of target objects of the target object set are embodied as target units and each have:
   a reflector;
   a detector for receiving the optical beam;
   an evaluation component connected to the detector and serving for checking a correspondence between the code modulated on the beam and the respectively dedicated identification code of the respective target unit; and
   a transmitting component for the communication, effected in the case of correspondence, of a reactive confirmation signal to the geodesic measurement device.

16. The geodesic measurement system as claimed in claim 1, wherein:
   a plurality of target objects of the target object set are embodied as target units and each have:
   a an optical retroreflector;
   a detector for omnidirectionally receiving the optical beam;
   an evaluation component connected to the detector and serving for checking a correspondence between the code modulated on the beam and the respectively dedicated identification code of the respective target unit; and
   a transmitting component for the communication, effected in the case of correspondence, of a reactive confirmation signal to the geodesic measurement device.

17. A geodesic measurement device for a measurement system as claimed in claim 1, wherein the measurement device is designed for identifying a target unit, representing one of a plurality of target objects of a target object set, and the target objects are respectively assigned a unique identification code, such that the target objects can be differentiated from one another on the basis of the identification code, and wherein the measurement device has:
   a distance and angle measuring functionality for determining the position of the target objects; and
   at least one radiation source for emitting an optical beam in a defined spatial direction, wherein the measurement device is designed for emitting the beam in such a way that the identification code of a sought target object from the target object set can be modulated as a code to be sought on the beam, and has:
   a receiving unit for expecting a target-unit-side confirmation signal within a predefined time window during and/or after the emission of the beam; and
   a processing component for identifying the target unit from the target object set on the basis of the confirmation signal.

18. A geodesic measurement device for a measurement system as claimed in claim 1, wherein the measurement device is designed for identifying a target unit, representing one of a plurality of target objects of a target object set, and the target objects are respectively assigned a unique identification code, such that the target objects can be differentiated from one another on the basis of the identification code, and wherein the measurement device has:
   a distance and angle measuring functionality for determining the position of the target objects; and
   at least one radiation source for emitting an optical beam in a pivottable, vertically fanned-out laser beam, wherein the measurement device is designed for emitting the beam in such a way that the identification code of a sought target object from the target object set can be modulated as a code to be sought on the beam, and has:
   a receiving unit for expecting a target-unit-side confirmation signal within a predefined time window during and/or after the emission of the beam, and
   a processing component for identifying the target unit from the target object set on the basis of the confirmation signal depending on a point in time of the reception of the confirmation signal.

19. A target unit for a measurement system as claimed in claim 1, said measurement system having a geodesic measurement device for identifying and determining the position of the target unit, wherein the target unit represents one of a plurality of target objects of a target object set, each of which is assigned a unique identification code, such that the target objects can be differentiated from one another on the basis of the identification code, and wherein the target unit includes:
   a reflector; and
   a detector for receiving an optical beam emitted by the measurement device on which a code is modulated;
   an evaluation component connected to the detector and serving for reading the code and for checking a correspondence between the code and the dedicated identification code of the target unit; and
   a transmitting component for the communication, effected in the case of correspondence, of a reactive confirmation signal to the measurement device, such that the target unit can be identified by the measurement device on the basis of the confirmation signal.

20. A target unit for a measurement system as claimed in claim 1, said measurement system having a geodesic measurement device for identifying and determining the position of the target unit, wherein the target unit represents one of a plurality of target objects of a target object set, each of which is assigned a unique identification code, such that the target objects can be differentiated from one another on the basis of the identification code, and wherein the target unit includes:
   an optical retroreflector; and
   a detector for omnidirectionally receiving an optical beam emitted by the measurement device the optical beam being part of a vertically fanned-out laser beam on which a code is modulated;
   an evaluation component connected to the detector and serving for reading the code and for checking a correspondence between the code and the dedicated identification code of the target unit; and
   a transmitting component for the communication, effected in the case of correspondence, of a reactive confirmation signal to the measurement device, such that the target unit can be identified by the measurement device on the basis of the confirmation signal.

21. A method for identifying a target unit by means of a geodesic measurement device which has a distance and angle measuring functionality, wherein the target unit represents one of a plurality of target objects of a target object set and the target objects are respectively assigned a unique identification code, such that the target objects can be differentiated from one another on the basis of the identification code, the method comprising the following steps:
   emitting an optical beam in a defined spatial direction by means of the measurement device; and
   detecting the beam by means of the target unit, wherein:
      the identification code of a sought target object from the target object set is modulated as a code to the sought on the optical beam;
      the target unit checks a correspondence between the code modulated on the received beam and the dedicated identification code of the target unit, and in the case of correspondence communicates a reactive confirmation signal to the geodesic measurement device; and
      the measurement device identifies the sought target unit on the basis of the reactive confirmation signal.

22. The method as claimed in claim 21, wherein the geodesic measurement device includes a theodolite or total station, and the measurement device identifies the sought target unit depending on a point in time of the reception of the reactive confirmation signal.

23. The method as claimed in claim 21, wherein the optical beam, for the purpose of searching a field-of-view range of the measurement device is inclined within a defined angular range and/or pivoted.

24. The method as claimed in claim 21, wherein the optical beam, for the purpose of searching a field-of-view range of the measurement device is inclined about a vertical axis of the measurement device.

25. The method as claimed in claim 21, wherein the target unit, in the case of correspondence having been ascertained, communicates the reactive confirmation signal with a known temporal response delay after the reception of the optical beam to the measurement device.

26. The method as claimed in claim 25, wherein:
   the target unit reflects part of the incident optical beam in the direction of the measurement device,
   the geodesic measurement device receives parts of the beam reflected at target objects and detects them as reflections, wherein the reflections are assigned a measured angle and a measured distance; and
   the identification of the target unit is effected by reception of the confirmation signal on the part of the measurement device, wherein that one of the detected reflections which corresponds temporally, taking account of the known response delay, to the confirmation signal is linked with the target unit.

27. The method as claimed in claim 26, wherein the linking of one of the detected reflections with the target unit is effected depending on:
   the point in time of the reception of the confirmation signal;
   an angle linked with the point in time of reception; and/or
   a distance information item.

* * * * *

UNITED STATES PATENT AND TRADEMARK OFFICE
CERTIFICATE OF CORRECTION

PATENT NO.        : 8,553,212 B2                                             Page 1 of 1
APPLICATION NO.   : 13/145551
DATED             : October 8, 2013
INVENTOR(S)       : Jaeger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this

Fifteenth Day of September, 2015

Michelle K. Lee
*Director of the United States Patent and Trademark Office*